US008312495B2

(12) United States Patent
Vanderhoff (10) Patent No.: US 8,312,495 B2
(45) Date of Patent: Nov. 13, 2012

(54) APPARATUS FOR REMOTELY CONTROLLING SET-TOP BOXES AND AN ASSOCIATED METHOD AND COMPUTER PROGRAM PRODUCT

(75) Inventor: Earl W. Vanderhoff, Cranston, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 538 days.

(21) Appl. No.: 11/620,176

(22) Filed: Jan. 5, 2007

(65) Prior Publication Data

US 2008/0166105 A1    Jul. 10, 2008

(51) Int. Cl.
*H04N 7/173* (2006.01)

(52) U.S. Cl. .................. 725/107; 348/734; 340/12.22

(58) Field of Classification Search .................. 725/153, 725/107
See application file for complete search history.

(56) References Cited

U.S. PATENT DOCUMENTS

| | | | | |
|---|---|---|---|---|
| 4,825,200 A | * | 4/1989 | Evans et al. | 341/23 |
| 5,781,720 A | * | 7/1998 | Parker et al. | 714/38.11 |
| 5,790,117 A | * | 8/1998 | Halviatti et al. | 715/744 |
| 6,091,882 A | * | 7/2000 | Yuen et al. | 386/293 |
| 6,229,433 B1 | * | 5/2001 | Rye et al. | 340/12.5 |
| 2001/0056576 A1 | * | 12/2001 | Park et al. | 725/48 |
| 2002/0087949 A1 | * | 7/2002 | Golender et al. | 717/124 |
| 2002/0194596 A1 | * | 12/2002 | Srivastava | 725/37 |
| 2003/0056215 A1 | * | 3/2003 | Kanungo | 725/38 |
| 2004/0172621 A1 | * | 9/2004 | Guillorit | 717/120 |
| 2004/0207535 A1 | * | 10/2004 | Stevenson et al. | 340/825.22 |
| 2005/0179558 A1 | * | 8/2005 | Williams et al. | 340/825.69 |
| 2005/0183128 A1 | * | 8/2005 | Assayag et al. | 725/105 |
| 2006/0020962 A1 | * | 1/2006 | Stark et al. | 725/32 |
| 2006/0064720 A1 | * | 3/2006 | Istvan et al. | 725/38 |
| 2006/0085579 A1 | * | 4/2006 | Sato | 710/73 |
| 2006/0095472 A1 | * | 5/2006 | Krikorian et al. | 707/104.1 |
| 2008/0010482 A1 | * | 1/2008 | Tsang | 714/2 |

* cited by examiner

Primary Examiner — Robert Hance (57) ABSTRACT

An apparatus is provided for remotely controlling set-top boxes. In general, a virtual remote controller is described including a memory device and a processor. The memory device is configured to store an image file and more than one signal file. The image file defines an image of a set-top box remote controller, and each signal file defines a command to control an operation of the set-top box. The processor is configured to generate the image of the remote controller according to the image file. The image of the remote controller includes buttons, and a signal file is associated with each button. Selecting a button causes a signal defined by the signal file associated with the selected button to be transmitted from the apparatus to the respective set-top box to command the set-top box to perform an operation. A method and a computer program product are also provided for remotely controlling set-top boxes.

26 Claims, 4 Drawing Sheets

APPARATUS FOR REMOTELY CONTROLLING SET-TOP BOXES AND AN ASSOCIATED METHOD AND COMPUTER PROGRAM PRODUCT

BACKGROUND

Set-top boxes are becoming increasingly prevalent in the homes and offices of many subscribers as a way to access content such as video, audio, Internet web pages, interactive games, and other types of content. In general, a set-top box is a device that is connected to the subscriber's equipment, typically a television, receives a signal from an external source, such as a content provider's server, and converts the signal into content that can be displayed on the subscriber's equipment. A set-top box may receive a signal through an Ethernet cable, a satellite dish, a coaxial cable, an optical fiber, a telephone line, an antenna, such as a Very High Frequency (VHF) or Ultra High Frequency (UHF) antenna, or other types of communication pathways. A set-top box may also receive a signal by accessing on-board or loadable media, such as hard disk drives, compact discs (CDs), or digital video discs (DVDs).

Many set-top boxes function like specialized computers and have the ability to send and receive information over the Internet or other wide area networks. For example, a set-top box may include one or more microprocessors, Random Access Memory (RAM), and microchips for decoding signals. The increasing complexity of set-top boxes has in turn increased the complexity of maintaining and repairing set-top boxes. As a result, technicians responsible for addressing the condition of set-top boxes, as well as the condition of the subscriber network in general, must possess greater skills to adequately understand the systems and to properly diagnose problems.

The skills necessary may be further increased as a result of variations among set-top boxes connected to a network, as different manufacturers produce different set-top boxes that are configured to send and receive signals in different ways. For example, different set-top boxes typically have differently configured remote controllers, such that the remote controller from one manufacturer's set-top box may not be able to command the same (or any) function on another manufacturer's set-top box. As a result, a user at a remote location, such as a technician attempting to evaluate a set-top box from the technician's office (i.e., without the benefit of the physical remote controller for that particular set-top box), would have to know what signals to send to the set-top box in order to elicit a particular response from the set-top box and analyze the result.

More specifically, set-top boxes typically receive commands from a subscriber through the subscriber's selection of functions associated with buttons on a remote controller, although, some set-top boxes may also include serial ports for receiving serial commands, such as RS-232 commands. A subscriber, for example, may depress a MENU button on the remote controller to display a set of options on a television screen. The subscriber may then use the buttons to scroll up or down through options listed on the screen and may depress a SELECT button to choose a highlighted option. Each press of a button on the remote controller by the subscriber typically results in the transmission of a signal containing the command, commonly in the form of an Infra Red (IR) signal, from the remote controller to the set-top box. Thus, a technician wishing to command a set-top box to perform a certain function without using the associated remote controller would need to know how to communicate with that particular set-top box. In other words, the technician would need to know how to generate and transmit the same IR signal produced by the set-top box's remote controller. Even if signals from the appropriate remote controller are captured and recorded in signal files, the technician would still be required to recognize which signal file corresponds to which command. The greater the variety of set-top boxes and remote controllers on the network, the more difficult the task becomes for a technician.

Thus, there is a need for providing a remote user, such as a technician, with the ability to control a set-top box without the benefit of using the associated remote controller in a manner that does not require the technician to understand or program the signal data.

DETAILED DESCRIPTION

Exemplary embodiments now will be described hereinafter with reference to the accompanying drawings, in which exemplary embodiments and examples are shown. Like numbers refer to like elements throughout.

Apparatuses and methods for remotely controlling set-top boxes are provided in accordance with various exemplary embodiments. In general, a virtual remote controller is described for making selections and entering commands to control an associated set-top box. The virtual remote controller captures the appearance and configuration of the physical remote controller corresponding to the particular set-top box and emulates the physical remote controller in function, as well. As a result, a user may intuitively make selections using the virtual remote controller in the same way that the user makes selections on the physical remote controller, thereby greatly reducing the learning curve associated with remotely operating various set-top boxes.

Figure 1:
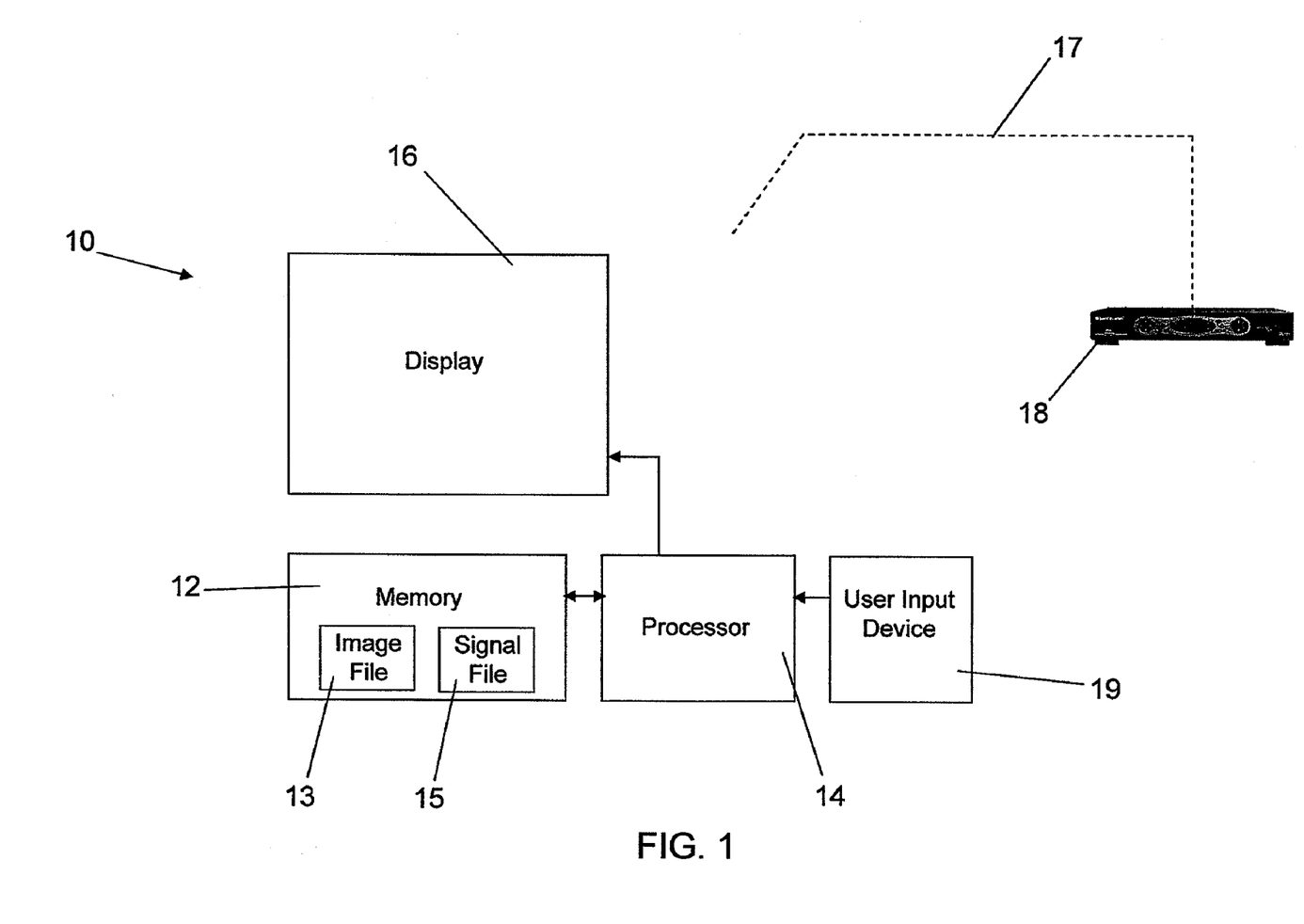
FIG. 1 is a schematic representation of one embodiment of an apparatus for remotely controlling a set-top box.

Referring to FIG. 1, embodiments of the apparatus 10 comprise a memory device 12 and a processor 14 in communication with the memory device 12. The memory device 12 is configured to store an image file defining an image of a set-top box remote controller and a plurality of signal files, and the processor 14 is configured to generate the image of the set-top box remote controller for display according to the image file. The apparatus 10 may also include a display 16, and the processor 14 may be configured to generate the image of the set-top box remote controller upon the display 16. As will be seen below, a user of the apparatus 10, such as a technician, may be able to interact with the processor 14 to access the image file 13 and corresponding signal files 15 for the remote controller of a respective set top box 18 stored in the memory device 12 in order to command the respective set-top box 18 to perform an operation by causing an appropriate signal 17 to be transmitted from the apparatus 10 to the respective set-top box 18. The processor 14 may also be configured to generate upon the display 16 an image corresponding to the operation of the respective set-top box 18, as will be discussed below.

Figure 2:
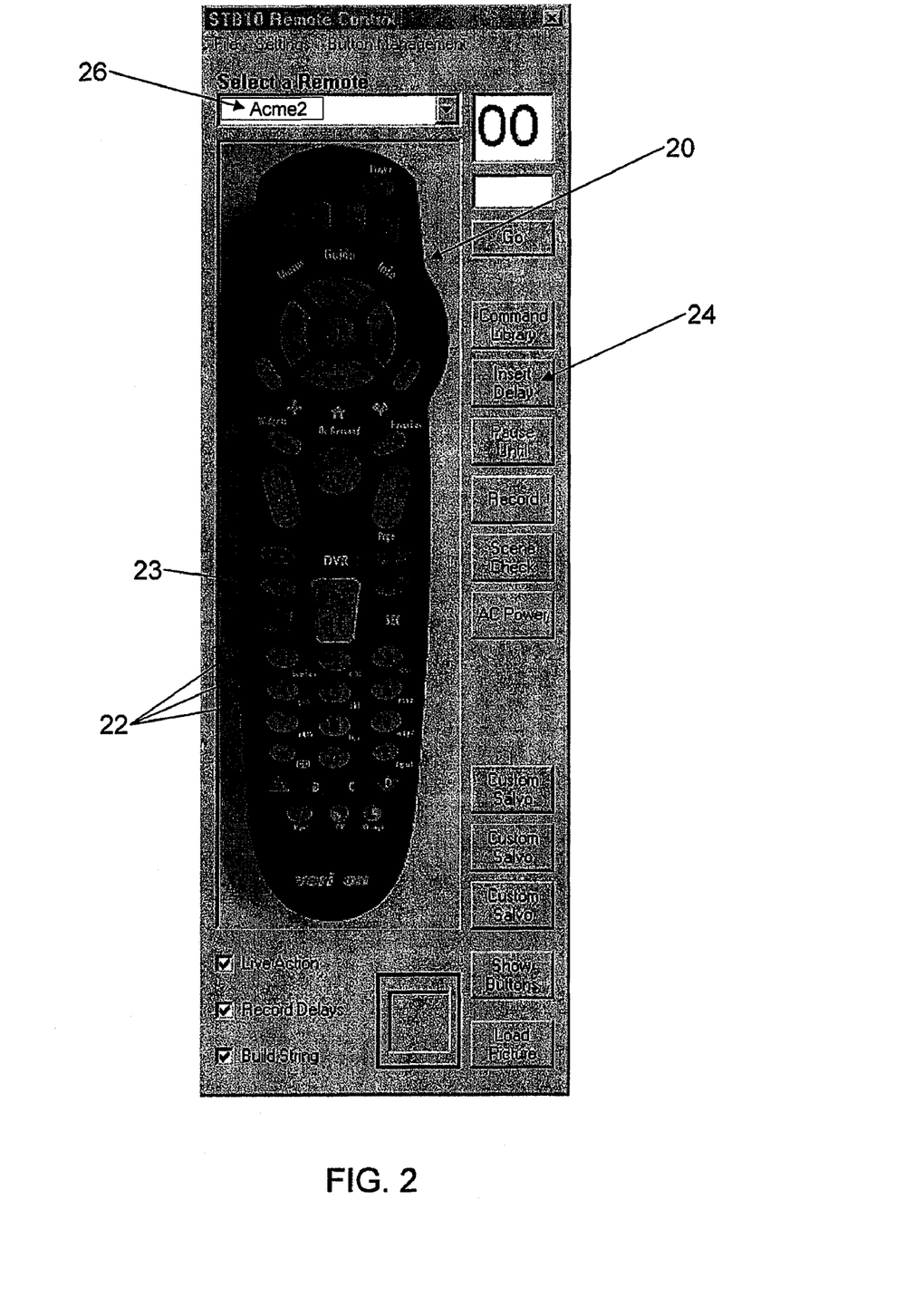
FIG. 2 illustrates one embodiment of an image generated by a processor of the apparatus of FIG. 1.

As illustrated in FIG. 2, the image 20 of the set-top box remote controller, which is defined by the image file 13, includes a plurality of remote controller buttons 22 and is configured to represent an actual, tangible remote controller associated with a particular set-top box. Each of the signal files 15 stored in the memory device 12 is configured to control an operation of a respective set-top box 18 and is associated with a respective button 22 in the image 20 of the set-top box remote controller. In other words, each signal file 15 is associated with a particular button 22 on a respective remote controller and defines a signal 17 that when presented to a respective set-top box 18 is: (1) identical to the signal transmitted by the conventional remote controller upon the user's depressing the associated button or (2) otherwise causes the same response action to be taken by the set-top box as if the respective remote controller had transmitted a signal in response to the user's depressing the associated button.

The signal files 15 can be created in various ways. For example, an interface may be used to capture an Infra Red (IR) signal from the actual remote controller associated with a particular set-top box; in other words, the interface may capture the signal emitted by the actual remote controller when one of the actual buttons is depressed. The signal may then be digitized and recorded in a signal file 15 that is stored, along with other signal files 15 corresponding to the signals transmitted by the actual remote controller in response to actuation of the other buttons, in the memory device 12. Alternatively, signal files 15 may be created through the manual entry of commands. Each signal file 15 may then be associated with the respective button 22 in the image 20 of the set-top box remote controller displayed by the processor 14.

For example, referring to FIGS. 1 & 2, the signal generated by an actual remote controller when the PLAY button is depressed may be captured, digitized, and recorded in a signal file in the memory device 12. The signal file 15 for the PLAY command is associated with the PLAY button 23 in the image 20 of the remote controller such that when a user selects the PLAY button 23 in the image 20, the processor 14 is responsive to that selection and causes the signal 17 for the PLAY command, as defined by the recorded signal file 15, to be transmitted to the respective set-top box 18. Upon receiving the signal 17, the set-top box 18 would perform the PLAY operation in generally the same manner that it would have performed the operation had the PLAY button on the actual remote controller been depressed. In this way, a remote user not having access to the physical remote controller, such as a technician in his office troubleshooting a problem with a set-top box located at a remote subscriber location, may be able to command the set-top box to perform various operations and evaluate the results.

The signal 17 generated by the apparatus 10 may be transmitted to the respective set-top box via a communications protocol, such as Transmission Control Protocol/Internet Protocol (TCP/IP). The signal 17 may then be converted to a format that is compatible with the set-top box 18. For example, depending on the type of command being carried on the signal 17 and the configuration of the set-top box 18, the signal 17 may be converted from a TCP/IP signal to an IR signal, or from a TCP/IP signal to a serial device control protocol signal, such as RS-232, to be received by a serial port of the set-top box 18.

The apparatus 10 may be configured to generate an image 20 of a set-top box remote controller having various buttons 22 corresponding to the buttons of the actual remote controller of the respective set-top box 18. For example, in some embodiments, the image 20 may have buttons 22, each of which is identified to perform one of the following functions: play, stop, pause, fast forward, reverse, next chapter, previous chapter, menu, scroll up, scroll down, scroll left, scroll right, and select. The selection of one of these buttons 22 in the image 20 may then cause an associated signal 17 defined by a respective signal file to be transmitted to the respective set-top box 18 in order to perform the identified function. Depending on the particular set-top box to be controlled and the associated set-top box remote controller, some of the above listed functions may not be included as buttons 22 in the image 20, and numerous other functions not mentioned may be included.

Figure 3:
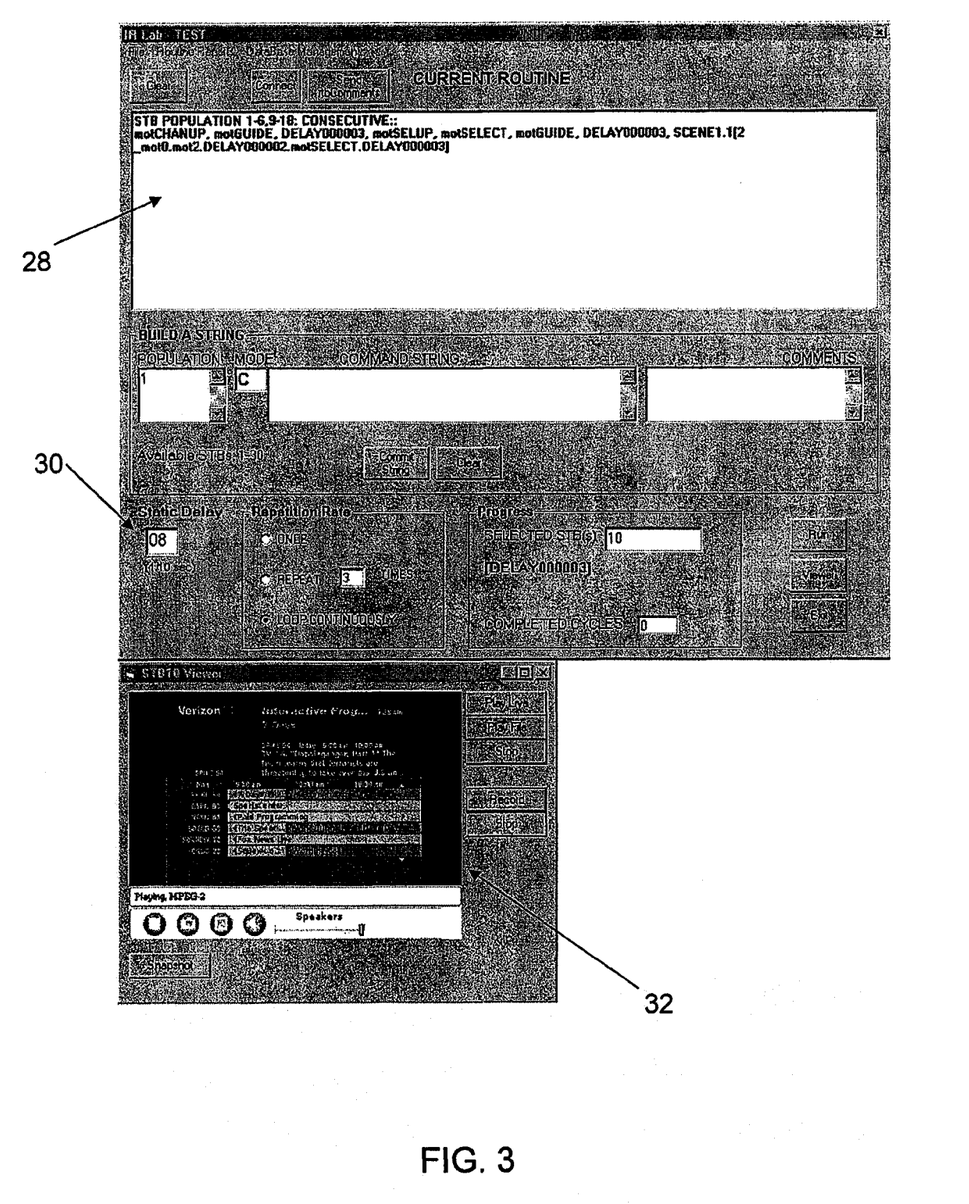
FIG. 3 illustrates windows of a user interface for configuring an apparatus of one embodiment.

The image 20 of the remote controller may be inset in one window of a larger display, as shown in FIG. 2. Other windows may also be displayed to facilitate the configuring of the virtual remote controller, either on the same screen as the window displaying the image 20 of the remote controller, or separately as shown in FIG. 3. Referring to FIG. 3, the auxiliary windows may, for example, include a text field 28 for displaying a string of commands being built and associated options for building the command string, as will be discussed below. In an exemplary embodiment, options may include a static delay field 30 for specifying a period of time between the transmission of each signal to the respective set-top box, regardless of the time delay recorded by the user when the buttons 22 in the image 20 of the remote controller were selected. For example, a static time delay of 8 seconds may be used as an input to simulate a delay of 8 seconds between each command, similar to a user waiting 8 seconds before depressing each subsequent button on a conventional remote controller. The time delay may be varied depending on the type of set-top box controlled and the capabilities of the set-top box to receive and implement a series of commands. In addition, a viewer 32 may be included to display video feedback from the respective set-top box 18 being controlled, such as during the construction of a command string, discussed below, or the execution of commands. For example, the viewer 32 may allow a technician to view the content received at the set-top box, in the same manner that a subscriber may view content on a television associated with a set-top box as the subscriber is viewing a program guide or selecting a movie to view.

The window in which the image 20 of the remote controller is displayed in some embodiments may also include other user input fields, such as buttons, check boxes, or the like, as shown in FIG. 2. In general, user input fields may be included, for example, for configuring the virtual remote controller and for facilitating the control of respective set-top boxes 18. While various functions may be associated with these fields, the exemplary buttons of the image shown in FIG. 2 include "command library" for displaying all available set-top box commands; "record" for taking a snapshot or continuously recording the operations of the set-top box; and "AC Power" for removing power from the respective set-top box 18 to simulate a power outage situation. A "scene check" button may also be provided for allowing a user to capture still-motion video scenes during the construction of a command string, for example to compare the scenes to reference video during the execution of the command string, such as to ensure that the correct channel was selected or the right movie was accessed.

The exemplary buttons shown in FIG. 2 also include "custom salvo" for accessing customized command strings for performing certain set-top box operations; "show buttons" for displaying the set-top box commands associated with the buttons 22 in the image 20 of the remote controller as well as accessing other commands for further associating the signal files 15 defining those commands with the displayed remote controller buttons 22; and "load picture" for accessing an image file 13 to display a particular image 20 of a set-top box remote controller. In addition, the exemplary embodiment includes check boxes for "live action" for transmitting the signals 17 corresponding to the signal files 15 associated with the buttons 22 selected in the image 20; "record delays" to record the time between each button 22 selection in addition to recording the command selected; and "build string" to facilitate building a string of commands by selecting a series of buttons 22 as will be discussed below, with or without transmitting the associated signals 17 to the respective set-top boxes 18 at the same time. The exemplary embodiment shown in FIG. 2 also includes a window to display the time between button selections and a window for specifying a respective set-top box.

The apparatus 10 may further be configured to store one or more selections made by a user interacting with the buttons 22 of the image 20. For example, a technician may build a string of commands corresponding to more than one operation of the respective set-top box 18 by selecting more than one button 22 in a desired sequence and/or selecting a particular button 22 more than once. The technician may, for example, wish to command the set-top box 18 to display a Menu screen, scroll to a particular movie, select the movie, play the movie, then pause the movie. The technician may select the buttons 22 in the image 20 corresponding to the commands she wishes to make (MENU, SCROLL UP, SCROLL UP, SCROLL UP, SCROLL UP, SELECT, PLAY, PAUSE) and store the selections in a string of commands.

The commands associated with the stored selections may be transmitted at the time the selections are made and remain available for future transmissions such as if the stored selections represent a batch process that is periodically performed for maintenance or diagnostic reasons. Alternatively, the technician may not wish to transmit the commands to the respective set-top box at the time the selections are made. Rather, the processor 14 may be configured to receive a user input defining a time for the associated signals 17 to be transmitted to the respective set-top box 18. For example, as illustrated in FIG. 2, the processor 14 may display an "Insert Delay" button 24 that, if selected by the user, allows the user to enter a time delay during which the apparatus 10 must wait before the signals 17 associated with the stored selections may be transmitted, such as a 2-hour delay. Other embodiments not pictured may allow a user to schedule a particular time for the stored selections to be executed (for example, at 2:00 A.M.).

The selection of buttons 22 of the apparatus 10 may result in other functions of the processor 14, as well. For example, the processor 14 may be configured to present an indication of the operation performed by the respective set-top box 18 in response to a user's selection of buttons 22. For example, as previously discussed, a user may view on the viewer 32, shown in FIG. 3, the content received at the set-top box 18 as a result of the executed commands. In this way, the technician may be able to evaluate whether the set-top box executed one or more operations in the required manner and address any problems. Other indications may be provided by the processor 14, such as messages ("Command Successful" or "Command Failed") generated on the display 16, to indicate a status of the command transmitted to the respective set-top box 18. Other functions may also result from the selection of buttons 22, as provided in U.S. Ser. No. 11/620,158, entitled "System for Testing Set-Top Boxes and Content Distribution Networks and Associated Methods", filed on Jan. 5, 2007, the content of which is incorporated by reference herein in its entirety.

Referring again to FIGS. 1 and 2, in some embodiments, the memory device 12 may be configured to store more than one image file 13 along with the signal files 15 associated with the buttons 22 of each image 20 defined by an image file 13. This may allow image files 13 defining images 20 of different set-top box remote controllers, such as different makes and models of set-top box remote controllers, to be stored in the memory device 12. The processor 14 may also be configured to receive a user's input as to which set-top box remote controller image 20 (and associated signal files 15) should be generated and displayed. For example, a technician may need to command a respective set-top box 18 that is controlled by an Acme2 model set-top box remote controller. The processor 14 may be configured to display a drop-down box 26, for example, allowing a user to select an Acme2 remote controller. The processor 14 may be configured to receive the user's input regarding which image 20 is desired and access the corresponding image file 13 and signal files 15 to generate the appropriate image 20.

In some cases, the apparatus 10 may be connected to more than one set-top box 18, for example if the apparatus 10 is in communication with multiple set-top boxes 18 over the Internet. The processor 14 may be further configured to receive a user input to determine which of the accessible set-top boxes 18 is to be controlled. For example, the processor 14 may be configured to receive a set-top box identifier, such as "STB5," in a text box to determine which set-top box 18 to control. Alternatively, the processor 14 may be configured to display a list of accessible set-top boxes 18, such as by listing the location of each device on the network. The user may then be able to select one of the accessible set-top boxes 18, and the processor 14 would receive the input to determine to which of the accessible set-top boxes 18 the signals 17 should be sent.

Figure 4:
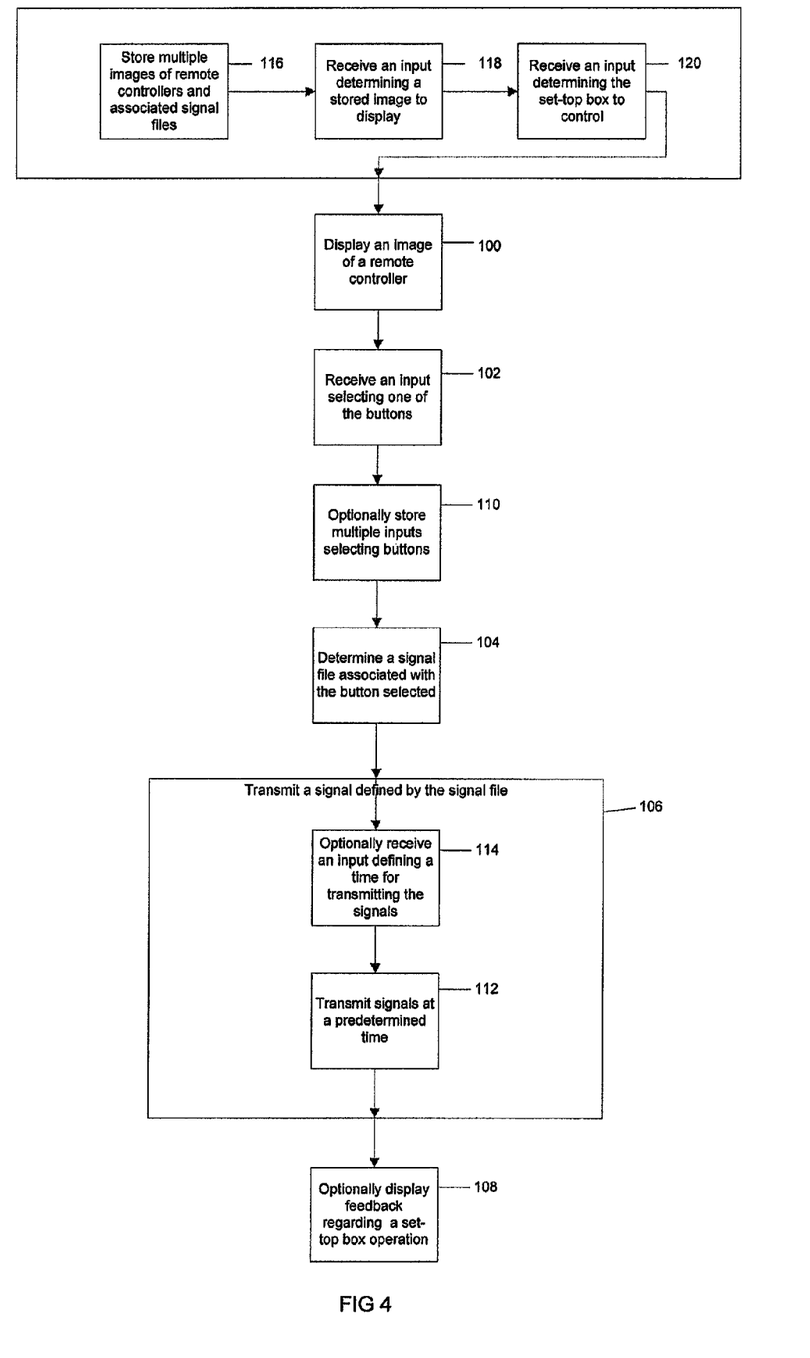
FIG. 4 is a flow chart illustrating embodiments of a method of remotely controlling a set-top box.

A method is also provided for remotely controlling set-top boxes. Referring to FIG. 4, an image 20 of a remote controller configured to control a set-top box is initially displayed. The image 20 includes more than one button 22, generally corresponding to buttons on the actual remote controller of the respective set-top box 18. An input selecting one of the buttons 22, such as an input by a technician, is then received, and a signal file 15 associated with the selected button 22 is determined. FIG. 4, blocks 100-104. The input may be provided in various manners, but the processor may be configured to track the cursor position upon the image and to recognize selection of a button 22 upon user actuation of a user input device 19, such as a mouse, keypad, or the like, while the cursor overlies the image of the respective button 22.

A signal 17 defined by the signal file associated with the button 22 selected may then be transmitted to the respective set-top box. For example, the signal 17 may be transmitted as an optical signal over an optical network, over an Internet connection through an Ethernet cable, or wirelessly via satellite. See block 106. The signal 17 transmitted to the respective set-top box 18 may cause the set-top box 18 to perform one or more operations. For example, the signal 17 may include a command to download video content from a main server and to play the content, such as a command to download and play a movie. The operation performed may then be displayed so that a user, such as a technician, may be able to evaluate the performance of the command. See block 108. Continuing the previous example, the movie to be downloaded and played may be displayed at the technician's location, rather than or in addition to being displayed at the subscriber's location, so that the technician may evaluate whether the commands were properly executed by the particular set-top box. In another embodiment, instead of displaying the movie as it would have been seen at the subscriber's location, a message may be displayed informing the technician that the operation requested was successfully executed.

Furthermore, one or more inputs, such as a string of selections, may be stored, and the associated signals defined by the signal files 15 associated with the buttons 22 selected may be transmitted to the respective set-top box at a predetermined time. See blocks 110-112. An input defining a time for transmitting the signals 17 may also be received. See block 114. For example, a technician may select various buttons 22 to command a set-top box to perform various functions, such as to download several movies. In addition to storing the string of selections, the technician may also provide a desired time at which the signals 17 associated with those selections should be transmitted.

In some embodiments, more than one image 20 corresponding to more than one set-top box remote controller, as well as the signal files 15 associated with the buttons 22 on each image 20, may be stored. See block 116. For example, different images 20 of set-top box remote controllers corresponding to different manufacturers and models of set-top boxes may be stored. Each image 20 may include different buttons 22 according to the particular model represented, and different signal files 15 may be associated with the buttons 22 of each image 20. An input from the user, such as a technician, may be received to determine which of the stored images should be displayed. See block 118. For example, the technician wishing to control an Acme2 model of set-top box may provide the model as an input, and the image 20 of the Acme2 set-top box remote controller may be displayed as a result.

More than one set-top box may be accessible to a user desiring to remotely control a set-top box. In such a case, an input from the user may be received to determine to which of the set-top boxes the signal 17 should be transmitted. See block 120. For example, a technician may have access to twenty set-top boxes but only have the need to control one of the accessible set-top boxes. In this case, the technician's input as to which set-top box should be controlled may be received to determine an appropriate pathway for the signal 17.

It is understood that the operations described for the illustrated methods of FIG. 4 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. For example, the executable portions may be stored in a memory 12 of the apparatus 10 of FIG. 1 such that the processor 14 may access and execute the executable portions of the computer program product in order to perform the functions described herein including, for example, those depicted in FIG. 4.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
a memory device configured to store an image file that at least partially defines an image of a set-top box remote controller that includes a plurality of remote controller buttons, and to store a plurality of signal files representing commands that are each configured to control an operation of a respective set-top box and are associated with respective buttons in the image of the set-top box remote controller; and
a processor configured to generate an image of a set-top box remote controller upon a display according to the image file and to respond to a selection of a respective remote controller button in the image of the set-top box remote controller so as to cause an associated signal to be transmitted to the respective set-top box;
wherein the processor is further configured to
receive a plurality of inputs selecting one or more of the buttons in a sequence, the selections made by a user interacting with the one or more of the buttons in the displayed image of the set-top box remote controller,
transmit, at a time the selections are made by the user, signals representing a sequence of commands associated with the one or more of the buttons selected in the sequence to the set-top box,
store, at the time the selections are made by the user, the plurality of inputs selecting the one or more of the buttons in the sequence for use in at least one future transmission of the sequence of commands associated with the one or more of the buttons selected in the sequence,
set a time delay between transmission of two or more commands in the sequence of commands for use in the at least one future transmission of the sequence of commands associated with the one or more of the buttons selected in the sequence,
automatically vary the time delay based on the set-top box type,
capture a plurality of still-images of video feedback of content received at the respective set-top box during execution, by the respective set-top box, of the sequence of commands associated with the signals transmitted to the respective set-top box, the content received at the set-top box comprising a movie, and
compare the plurality of still-images of the video feedback to at least a portion of a reference video.

2. The apparatus of claim 1 wherein the processor is further configured to present an indication of the operation of the respective set-top box, the indication comprising the video feedback of the content received at the respective set-top box during execution, by the respective set-top box, of the sequence of commands associated with the signals transmitted to the respective set-top box.

3. The apparatus of claim 1 wherein the processor is further configured to
receive a user input defining a time for the at least one future transmission of the sequence of commands associated with the one or more of the buttons selected in the sequence to the respective set-top box, and
cause signals representing the sequence of commands associated with the one or more of the buttons selected in the sequence to be transmitted to the respective set-top box at the defined time.

4. The apparatus of claim 1 wherein the memory device is further configured to store a plurality of image files and associated signal files, each image file configured for use by the processor to display an image of a different set-top box remote controller.

5. The apparatus of claim 4 wherein the processor is further configured to receive a user input to determine the image file to display.

6. The apparatus of claim 1 wherein the processor is further configured to receive a user input to determine the respective set-top box to be controlled.

7. The apparatus of claim 1, wherein the processor is further configured to display a text field containing the sequence of commands as a buildable string.

8. The apparatus of claim 1, wherein:
the apparatus is in communication with a plurality of set-top boxes that are accessible by the apparatus, the plurality of set-top boxes including the set-top box, and
the processor is further configured to receive input selecting the set-top box from among the plurality of set-top boxes to be controlled by the apparatus.

9. A method comprising:
displaying, by a virtual remote controller apparatus on a display, an image of a physical remote controller configured to control a set-top box, the image including a plurality of buttons;
receiving, by the virtual remote controller apparatus, a plurality of inputs selecting one or more of the buttons in a sequence, the selections made by a user interacting with the one or more of the buttons in the displayed image of the physical remote controller;
transmitting, by the virtual remote controller apparatus and at a time the selections are made by the user, signals representing a sequence of commands associated with the one or more of the buttons selected in the sequence to the set-top box;
storing, by the virtual remote controller apparatus and at the time the selections are made by the user, the plurality of inputs selecting the one or more of the buttons in the sequence for use in at least one future transmission of the sequence of commands associated with the one or more of the buttons selected in the sequence;
setting, by the virtual remote controller apparatus, a time delay between transmission of two or more commands in the sequence of commands for use in the at least one future transmission of the sequence of commands associated with the one or more of the buttons selected in the sequence;
automatically varying, by the virtual remote controller apparatus, the time delay based on at least one of the set-top box type and capabilities of the set-top box to receive and implement a series of commands;
capturing, by the virtual remote controller apparatus, a plurality of still-images of video feedback of content received at the set-top box during execution, by the set-top box, of the sequence of commands associated with the signals transmitted to the set-top box, the content received at the set-top box comprising a movie; and
comparing the plurality of still-images of the video feedback to at least a portion of a reference video.

10. The method of claim 9 further comprising presenting, by the virtual remote controller apparatus, an indication of at least one set-top box operation resulting from the transmitting of the signals to the set-top box, the indication comprising the video feedback of the content received at the set-top box during execution, by the set-top box, of the sequence of commands represented by the signals.

11. The method of claim 9 further comprising receiving, by the virtual remote controller apparatus, an input defining a time for the at least one future transmission of the sequence of commands.

12. The method of claim 9 further comprising storing, by the virtual remote controller apparatus, a plurality of images corresponding to a plurality of set-top box remote controllers and signal files associated with the buttons on each image.

13. The method of claim 12 further comprising receiving, by the virtual remote controller apparatus, an input determining at least one of the stored images to display.

14. The method of claim 9 further comprising receiving, by the virtual remote controller apparatus, an input to determine the set-top box to control.

15. The method of claim 9 wherein the signals are transmitted by the virtual remote controller apparatus to the set-top box via Transmission Control Protocol/Internet Protocol (TCP/IP).

16. The method of claim 9 further comprising displaying, by the virtual remote controller apparatus and together with the image of the physical remote controller on the display, a record button for taking a snapshot of operations of the set-top box.

17. The method of claim 9 wherein the stored plurality of inputs represents a batch process configured to be periodically performed for maintenance or diagnostic reasons.

18. The method of claim 17 further comprising periodically transmitting, by the virtual remote controller apparatus and to the set-top box, signals representing the sequence of commands associated with the one or more of the buttons selected in the sequence in accordance with the stored plurality of inputs to perform the batch process for the maintenance or diagnostic reasons.

19. The method of claim 9 further comprising recording, by the virtual remote controller apparatus, time delays between the user selections of the one or more of the buttons in the sequence.

20. The method of claim 19 further comprising displaying, by the virtual remote controller apparatus on the display, the time delays between the user selections of the one or more of the buttons in the sequence.

21. The method of claim 9 further comprising displaying on the display, by the virtual remote controller apparatus, the content received at the set-top box regardless of whether the content received at the set-top box is displayed on another display associated with the set-top box.

22. A computer program product comprising a non-transitory computer-readable storage medium having computer-readable program code portions stored therein, the computer-readable program code portions comprising:
a first executable portion for displaying an image of a remote controller configured to control a set-top box, the image including a plurality of buttons;
a second executable portion for receiving a plurality of inputs selecting one or more of the buttons in a sequence, the selections made by a user interacting with the one or more of the buttons in the displayed image of the remote controller;
a third executable portion for transmitting, at a time the selections are made by the user, signals representing a sequence of commands associated with the one or more of the buttons selected in the sequence to the set-top box;
a fourth executable portion for storing, at the time the selections are made by the user, the plurality of inputs selecting the one or more of the buttons in the sequence for use in at least one future transmission of the sequence of commands associated with the one or more of the buttons selected in the sequence;
a fifth executable portion for setting, by the virtual remote controller apparatus, a time delay between transmission of two or more commands in the sequence of commands for use in the at least one future transmission of the sequence of commands associated with the one or more of the buttons selected in the sequence;

a sixth executable portion for automatically varying, by the virtual remote controller apparatus, the time delay based on at least one of the set-top box type and capabilities of the set-top box to receive and implement a series of commands;

a seventh executable portion for capturing a plurality of still-images of video feedback of content received at the set-top box during execution, by the set-top box, of the sequence of commands associated with the signals transmitted to the set-top box, the content received at the set-top box comprising a movie; and an eighth executable portion for comparing the plurality of still-images of the video feedback to at least a portion of a reference video.

23. The computer program product of claim 22 further comprising a ninth executable portion for presenting an indication of at least one set-top box operation resulting from the transmitting of the signals to the set-top box, the indication comprising the video feedback of the content received at the set-top box during execution, by the set-top box, of the sequence of commands associated with the signals transmitted to the set-top box.

24. The computer program product of claim 22 further comprising a ninth executable portion for receiving an input defining a time for the at least one future transmission of the sequence of commands.

25. The computer program product of claim 22 further comprising a ninth executable portion for storing a plurality of images corresponding to a plurality of set-top box remote controllers and signal files associated with the buttons on each image; and a sixth executable portion for receiving an input determining at least one of the stored images to display.

26. The computer program product of claim 22 further comprising a ninth executable portion for receiving an input to determine the set-top box to control.

* * * * *